Figure 1:
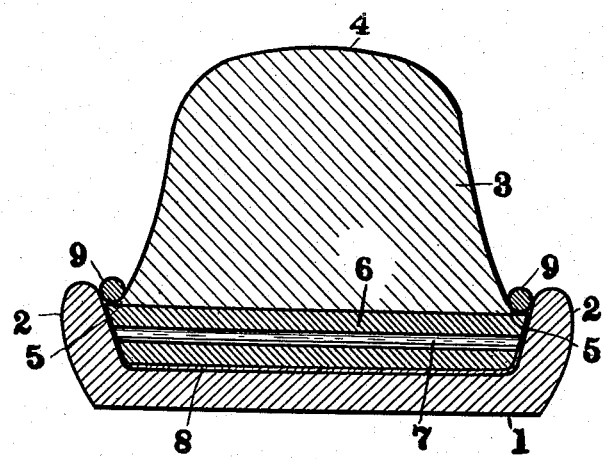

F. A. SEIBERLING.
TIRE FOR VEHICLE WHEELS.
APPLICATION FILED JULY 2, 1908.

937,186.

Patented Oct. 19, 1909.

WITNESSES
Glenara Fox
E. E. Morse

INVENTOR
Frank A. Seiberling
C. E. Humphrey.
ATTORNEY

UNITED STATES PATENT OFFICE.

FRANK A. SEIBERLING, OF AKRON, OHIO.

TIRE FOR VEHICLE-WHEELS.

937,186.  Specification of Letters Patent.  Patented Oct. 19, 1909.

Application filed July 2, 1908. Serial No. 441,570.

*To all whom it may concern:*

Be it known that I, FRANK A. SEIBERLING, a citizen of the United States, residing at Akron, in the county of Summit and State of Ohio, have invented new and useful Improvements in Tires for Vehicle-Wheels, of which the following is a specification.

This invention has relation to elastic tires for vehicles and especially to that type of tires in which the body portion thereof is secured in position on a wheel rim by the employment of circumferentially-arranged retaining-wires supported by spaced transverse wires or bars. Experience has demonstrated that in this class of elastic tires the movement of the rubber of the tread portion of the tire under compression when in use is communicated through the rubber to the cross wires embedded therein, causing them to move about to such an extent that in a very short time they become separated from the tire body and wear or grind the adjacent material sufficiently to form constantly enlarging openings around them and thereby become loose and ineffectual for sustaining the circumferential wires. Experience has further demonstrated that the contractile action of the circumferential wires on the cross wires causes the latter to cut and tear the rubber downwardly toward the base of the tire as long as the circumferential wires are under tension, so much so that a lateral strain on the tread of the tire easily tears the tire body surrounding the transverse wires to such an extent that it becomes too weak under an unusual strain to retain itself in its seat on the wheel rim.

The objects of this invention are therefore, broadly speaking, to so construct a tire of the general class named that the transverse wires in the base thereof will be so firmly anchored in the material of the tire that they cannot be torn therefrom, by providing suitable means for preventing the cutting of the material of the base of the tire by the transverse wires or bars, thus eliminating the danger of the tire becoming loosened in its seat.

In carrying into effect the foregoing object, the known characteristic, that hard rubber will unite both with the metal of the cross bars and also with the resilient soft rubber which usually composes the body portion of a tire so firmly that they become an integral article and substantially inseparable, is employed. The hard rubber resists the wear of the retaining-wire much more effectually than does soft rubber and is not readily cut thereby, at the same time the usual difficulty of uniting the cross-wire with soft vulcanized rubber is avoided, thereby eliminating the weaknesses usually present in tires of this type where the retaining wires are vulcanized in the body of soft rubber.

The invention consists therefore, specifically, in surrounding each of the transverse wires in the base of the tire with a body of hard rubber which will unite therewith and with the soft resilient body portion of the tire and form so secure a union as not to be readily separated, thus providing a tire with all the elastic characteristics of a soft rubber tread and further provided with means whereby the movement of the rubber of the tread portion is not communicated to the cross wires by reason of the interposition of hard rubber and at the same time the hard rubber constitutes an effectual covering for preventing the cutting of the material of the tire.

A further object obtained by the foregoing construction is to afford an effectual seat of hard rubber for the circumferential retaining wires, whereby said wires will be supported at intervals on the bodies of hard rubber and will engage the soft material of the body portion of the tire in the spaces intervening between the hard rubber portions, the soft rubber existing between the spaced hard rubber portions serving to keep the circumferential wires under tension at all times, thereby preventing their becoming loosened.

With the foregoing and other objects in view, the invention consists in the novel construction, combination and arrangement of parts constituting the invention to be hereinafter specifically described and illustrated in the accompanying drawings which form a part hereof, wherein is shown the preferred embodiment of the invention, illustrated by way of example in connection with a side wire tire, but it is to be understood that changes, variations and modifications can be resorted to which come within the scope of the claims hereunto appended.

Figure 2:
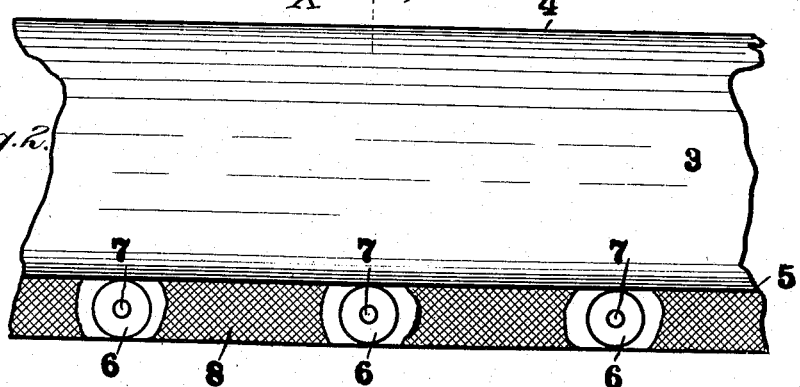

In the drawings in which similar reference numerals indicate like parts in the different figures: Figure 1 is a view in cross-section of the rim portion of a vehicle wheel showing a tire mounted thereon and in section on line X of Fig. 2; Fig. 2 is a view in side elevation of the tire shown in Fig. 1 dismounted from the rim, and, Fig. 3 is a view in cross section of the rim portion of a vehicle wheel showing a modified form of tire mounted thereon.

Referring to the drawings, the reference numeral 1 denotes a vehicle rim of the ordinary type provided with lateral outwardly-extending flanges 2, 2. Mounted in the channel thus formed is an elastic vehicle tire 3 provided with a tread 4 of any preferred construction and further preferably provided with lateral shoulders 5. Embedded at intervals in the base of the tire are a plurality of tubular hard rubber members 6 extending preferably from side to side of the tire in which are positioned transverse wires or bars 7. The base portion of the tire is preferably covered with a layer of fabric 8. The members 6 of hard rubber are preferably of such a diameter as to extend from the base or lower face of the tire upwardly to the lateral shoulders 5, and to be there exposed.

The tire is retained in its seat in the rim 1 by means of circumferential wires 9, under tension, seated on the shoulders 5 and held from lateral displacement by means of the flanges 2 of the rim. In constructing this tire the soft rubber portion 3 is first formed in the usual manner well known to those skilled in the art to which this invention appertains. The bodies of hard rubber inclosing the cross wire or bar are then positioned at intervals in the base portion thereof, as shown in Fig. 2; afterward the base of the tire is covered with fabric and the entire tire subjected to a vulcanizing heat which causes the hard rubber to unite securely both with the cross wires inclosed therein and also by reason of the nature of the material of the same to the tread or resilient portion thereof.

Figure 3:
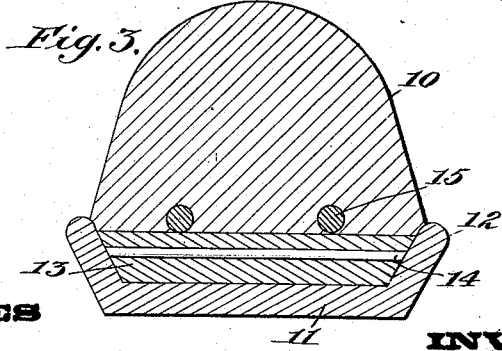

In Fig. 3 is shown a modified type of tire embodying this invention, comprising a body portion 10 of resilient material adapted to be mounted on a rim 11 provided with lateral outwardly-extending flanges 12 of the well known type commonly employed for seating tires of the A. W. Grant pattern. Embedded at intervals in the base of the tire are a plurality of tubular hard rubber members 13 extending preferably from side to side of the tire in each of which is positioned a transverse wire or bar 14. The means employed for securing a tire of this type in position in the rim consists of a plurality of circumferentially-extending wires 15 positioned in suitably-formed circumferential openings in the tire body disposed immediately above the position occupied by the transversely-extending spaced hard rubber members 13, so that the outer periphery of each of the hard rubber members 13 constitutes a seat to receive the circumferential wires 15, and when the latter are contracted in seating the tire, they will force the hard rubber members 13 firmly into position in the rim 11.

As has been already mentioned, when properly prepared, the two bodies of rubber being of the same general type of material although differently compounded will unite into an integral body by the heat necessary to vulcanize them; at the same time the hard rubber will unite with the cross bars so tightly as to prevent any movement thereof and the movement of the soft rubber in the tread portion cannot be communicated to the cross wires, thereby preventing them from moving sufficiently to cause a cutting or tearing of the rubber surrounding them. It will also be noted that the spacing apart of the hard rubber bodies provides an interposed portion of soft resilient rubber between them to enable the tire to move longitudinally under the compression of a load without displacing the cross-wires; in other words, the tire is permitted a reasonable amount of movement by the fact that the hard rubber is not continuous but is interrupted to permit this effect.

A further object obtained by spacing the bodies of hard rubber apart is that the resilient rubber existing between them permits of the longitudinal compression or stretching of the tire in order to seat it on a wheel rim, for instance if the tire is made in a continuous strip and it becomes necessary in seating the same on a rim to stretch or compress it longitudinally in order to make the ends thereof unite it can be readily done, and if the tire is made annular it may be stretched sufficiently to permit it to be slipped laterally over one of the flanges of the wheel rim on which it is to be mounted and when passed thereover it will contract of its own inherent resiliency and seat itself in the channel of the rim.

What I claim and desire to secure by Letters Patent, is:—

1. A vehicle tire consisting of a base having an expansible and contractible inner face, and a series of transversely-extending non-elastic, vulcanizable hard rubber elements suitably spaced from each other and embedded in and arranged at the inner part of said face, said elements and said base intimately connected together to provide a homogeneous tire.

2. A vehicle tire consisting of a base having an expansible and contractible inner face, and a series of transversely-extending non-elastic, vulcanizable hard rubber elements suitably spaced from each other and embedded in and arranged at the inner part of said face, and a transversely-extending metallic core for each of said elements, said elements, said base, and said cores intimately connected together to provide a homogeneous tire.

3. A vehicle tire consisting of a base having an expansible and contractible inner face, and a series of transversely-extending non-elastic, vulcanizable hard rubber elements suitably spaced from each other and embedded in and arranged at the inner part of said face, and a transversely-extending metallic core for each of said elements, said elements, said base, and said cores intimately connected together to provide a homogeneous tire, said cores of a length equal to the length of each of said elements.

4. A vehicle tire consisting of a base having an expansible and contractible inner face, and a series of transversely-extending non-elastic, vulcanizable hard rubber elements suitably spaced from each other and embedded in and arranged at the inner part of said face, said elements and said base intimately connected together to provide a homogeneous tire, each of said elements of a length equal to the width of the inner portion of the base.

5. A vehicle tire consisting of a base having an expansible and contractible inner face, and a series of transversely-extending non-elastic, vulcanizable hard rubber elements suitably spaced from each other and embedded in and arranged at the inner part of said face, and a transversely-extending metallic core for each of said elements, said elements, said base, and said cores intimately connected together to provide a homogeneous tire, each of said elements of a length equal to the width of the inner portion of the base.

6. A vehicle tire consisting of a base having an expansible and contractible inner face, and a series of transversely-extending non-elastic, vulcanizable hard rubber elements suitably spaced from each other and embedded in and arranged at the inner part of said face, and a transversely extending metallic core for each of said elements, said elements, said base, and said cores intimately connected together to provide a homogeneous tire, said cores of a length equal to the length of each of said elements, each of said elements of a length equal to the width of the inner portion of the base.

7. A vehicle tire consisting of a soft rubber base and a series of transversely-extending vulcanizable hard rubber elements embedded in said base whereby the soft rubber will completely surround the element from end to end thereof and provide the base with a contractible and expansible inner face.

8. A vehicle tire consisting of a soft rubber base and a series of transversely-extending vulcanizable hard rubber elements embedded in said base whereby the soft rubber will completely surround the element from end to end thereof and provide a base with a contractible and expansible inner face, and a metallic core for each of said elements, said core, elements, and base intimately connected together to provide a homogeneous tire.

In testimony whereof I have hereunto set my hand in presence of two subscribing witnesses.

FRANK A. SEIBERLING.

Witnesses:
C. E. HUMPHREY,
GLENARA FOX.